United States Patent [19]
Weissmann

[11] Patent Number: 5,618,489
[45] Date of Patent: Apr. 8, 1997

[54] APPARATUS AND PROCESS FOR BLOW MOLDING CONTAINERS

[75] Inventor: Dan Weissmann, Ann Arbor, Mich.

[73] Assignee: Hoover Universal, Inc., Plymouth, Mich.

[21] Appl. No.: 539,621

[22] Filed: Oct. 5, 1995

[51] Int. Cl.⁶ .................................................. B29C 49/18
[52] U.S. Cl. ........................ 264/530; 264/906; 425/526; 425/534; 425/540
[58] Field of Search .................................... 264/530, 905, 264/906; 425/526, 534, 538, 540

[56] References Cited

U.S. PATENT DOCUMENTS

| | | | |
|---|---|---|---|
| 4,299,549 | 11/1981 | Suzuki et al. | 425/526 |
| 4,752,206 | 6/1988 | Nowicki et al. . | |
| 4,790,741 | 12/1988 | Takausaki et al. | 264/905 |
| 4,836,971 | 6/1989 | Denis et al. . | |
| 5,229,042 | 7/1993 | Denis et al. . | |
| 5,248,533 | 9/1993 | Sugiura et al. . | |
| 5,277,574 | 1/1994 | Denis et al. . | |
| 5,540,879 | 7/1996 | Orimoto et al. | 264/906 |

FOREIGN PATENT DOCUMENTS 3-224715  10/1991  Japan ................................ 264/906

*Primary Examiner*—Catherine Timm
*Attorney, Agent, or Firm*—Harness, Dickey & Pierce, P.L.C.

[57] ABSTRACT

An apparatus and method for blow molding hot-fill containers by a double blow process while utilizing a single blow molding wheel. The apparatus has multiple stations including preheat station for conditioning the preforms, a blow molding station having a single blow molding wheel, a heat treating station where intermediate containers are heat treated. The blow molding wheel is provided with two sets of molds, one set for forming the intermediate containers and another set for forming the final containers. Two transfer mechanism are used to achieve four different transfers of the various stages of the final container. Preforms and heat treated intermediate containers are being respectively transferred into the first and second molds by one transfer mechanism while untreated intermediate containers and final containers are respectively removed form the first and second molds by the second transfer station.

7 Claims, 6 Drawing Sheets

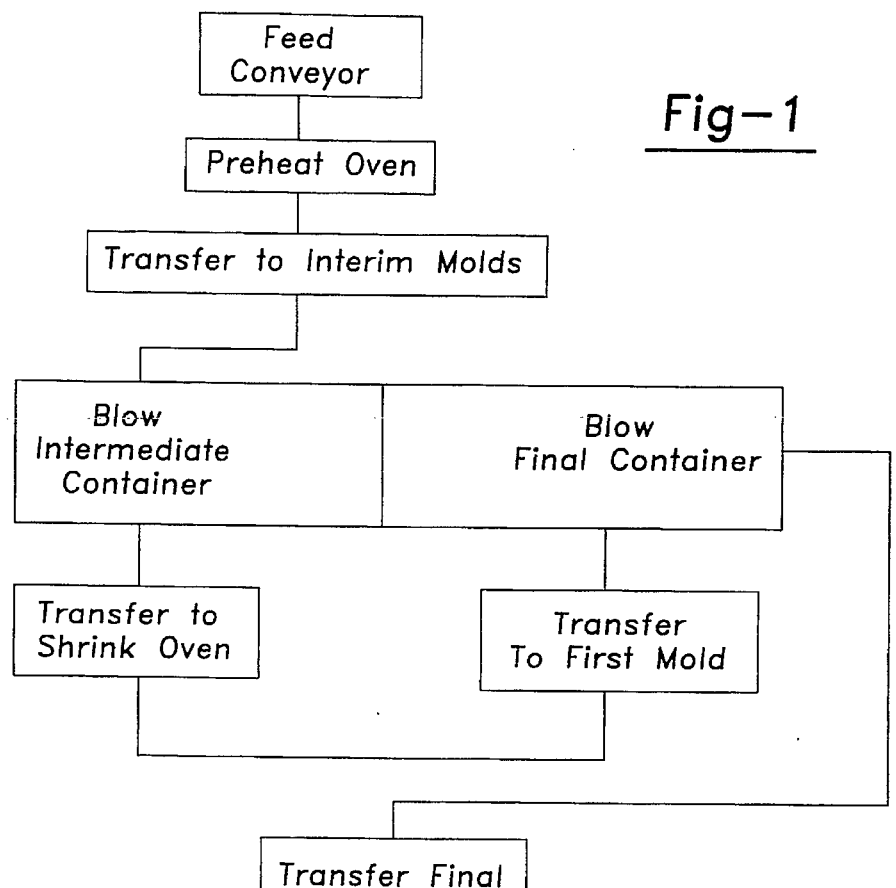
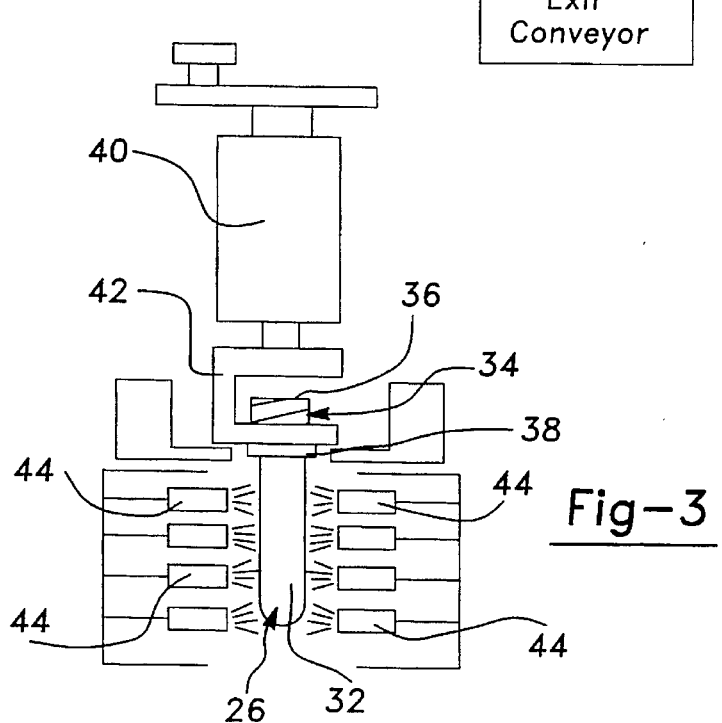

APPARATUS AND PROCESS FOR BLOW MOLDING CONTAINERS

BACKGROUND OF THE INVENTION

1. Field of the Invention

The present invention relates to a blow molding machine and process for blow molding heat resisting containers. More particularly, the present invention relates to a double-blow, heat set blow molding machine capable of forming "hot-fill" containers while using only a single blow molding wheel.

2. Description of the Prior Art

Plastic containers, and in particular light weight plastic bottles, are widely used to contain liquids, including carbonated and non-carbonated beverages. Because of the various manufacturing processes which must be undergone to ensure the proper "bottling" of the liquids, the containers must be able to withstand sever heat conditions without any appreciable deformation. These extreme heat conditions are encountered, for example, when the containers are filled with a hot liquid (filling temperatures of approximately 95° C.) and when encountering high temperatures (60°–80° C.) over a long period of time (one to two hours) during pasteurization of the liquid contents. Unless the container has been properly conditioned to withstand these temperatures, the container will deform and result in an unacceptable commercial product.

One successful method of producing thermally stable containers is known in the industry as the "double-blow heat set" process. When molding plastic containers with this process, injection molded preforms are conveyed through a preheating oven to produce a desired temperature profile within the preforms. When at the proper temperature, the preforms exit the oven and are transferred to a rotating blow molding wheel. The blow molding wheel contains multiple blow molds and each mold into which a preform is loaded has a cavity which defines an intermediate configuration for the container. After initial blowing of the preform into an intermediate container configuration, the intermediate container is transferred to a conveyor that transports it through a heat treating oven.

In this oven, the applied heat causes the intermediate containers to undergo a significant degree of shrinkage and deformation. However, the deformation is not so sever that the container side walls completely collapse causing them to adhere to each other and preventing further use. Rather, the intermediate container experiences an overall amount of shrinkage which will allow the container to be re-blown.

Upon exiting the heat treating oven, the heat treated intermediate container is transferred into a mold on a second blow molding wheel. These molds include a mold cavity which defines the final configuration of the container. The heat treated intermediate container is then molded into the final configuration and the resulting containers is removed.

As seen from the above discussion, previous double-blow heat set machines and their methods of operation require that two separate blow molding wheel machines and four transfer mechanisms be used in forming the final container. Constructing, purchasing and maintaining a two wheeled, blow molding machine is itself an expensive undertaking and this translates into a costly final product.

With each wheel blow molding machines costing in the several million dollar range and with the profit margins being pennies on a container, and further in view of other limitations, shortcomings and disadvantages not specifically mentioned above, it should be apparent that there still exists a need for a more cost effective way to produce these heat resistant containers.

It is therefore a primary object of this invention to fulfill that need by providing a blow molding machine for blow molding heat resistant containers generally according to the double-blow heat set process.

Another object of the present invention is to provide a double-blow molding machine which requires only a single blow molding wheel.

A further object of this invention is to reduce the number of transfer mechanisms needed to handle the preforms intermediate and final containers in order to run the machine.

Yet another object of this invention is to provide a double blow molding machine having the variability to increase or decrease residence times in the various molds and the heat treating oven.

SUMMARY OF THE INVENTION

Briefly described, the above and other objects are accomplished according to the present invention by providing a single wheel blow molding machine capable of blow molding thermally stable containers by a double-blow method. The resulting containers are capable of withstanding both hot-fill and pasteurizing processing conditions without appreciable deformation. Additionally, the container is extremely cost efficient to produce.

The machine of the present invention has various stations and generally includes a preheating station, a blowing or molding station, and an annealing station. In the first or preheat station, the preforms are preheated or combined to where the body of the preform is at the proper temperature for blow molding. From the preheat station, the preforms are transferred to a blow molding wheel. The molding wheel includes two types of molds, each with a different cavity configuration. One mold defines a configuration of an intermediate container. The preforms are transferred into these "intermediate" molds. The preforms are then blown into intermediate containers which are in turn removed from the intermediate molds and transferred to the heat treating oven. In the oven, the intermediate containers are heat treated and then transferred back to the blow molding wheel. This time, the heat treated containers are loaded into a second set of molds, the finishing molds, which have molding surfaces that define the final configuration of the container. The heat treated intermediate containers are blow molded a second time and the final containers removed and transferred for further processing.

As briefly discussed above, both of the blowing steps are performed at the same station where a single, rotatable blow molding wheel is provided with two sets of molds. One set of the molds for forming the intermediate containers and the other set for forming the final containers. In one embodiment of the invention, the molds are alternatingly located about the wheel. In another embodiment, Two intermediate molds are located between each set of final molds or vice versa. These latter constructions allow for longer residence times of the intermediate containers in the heat treating oven or for longer blowing cycles and residence times in the molds themselves.

From the above, it can be seen that as the blow molding wheel is rotating, four different transfers of preforms and containers (the containers at different stages of formation) take place. This, however, is done with only two transfer mechanisms. The preforms and annealed intermediate containers are respectively transferred into the first and second molds by one transfer mechanism. The untreated intermediate containers and final containers are respectively transferred to the heat treating oven and exit conveyor by the second transfer mechanism.

Additional benefits and advantages of the present invention will become apparent to those skilled in the art to which the invention relates from the subsequent description of the preferred embodiment and the appended claims, taken in conjunction with the accompanying drawings.

BRIEF DESCRIPTION OF THE DRAWINGS

FIG. 1 is a flow chart depicting the process by which heat resistant containers are manufactured according to the principles of the present invention;

FIG. 3 is a schematic view of a perform being preheated in a preheating oven prior to blow molding;

DETAILED DESCRIPTION OF THE PREFERRED EMBODIMENT

Figure 2:
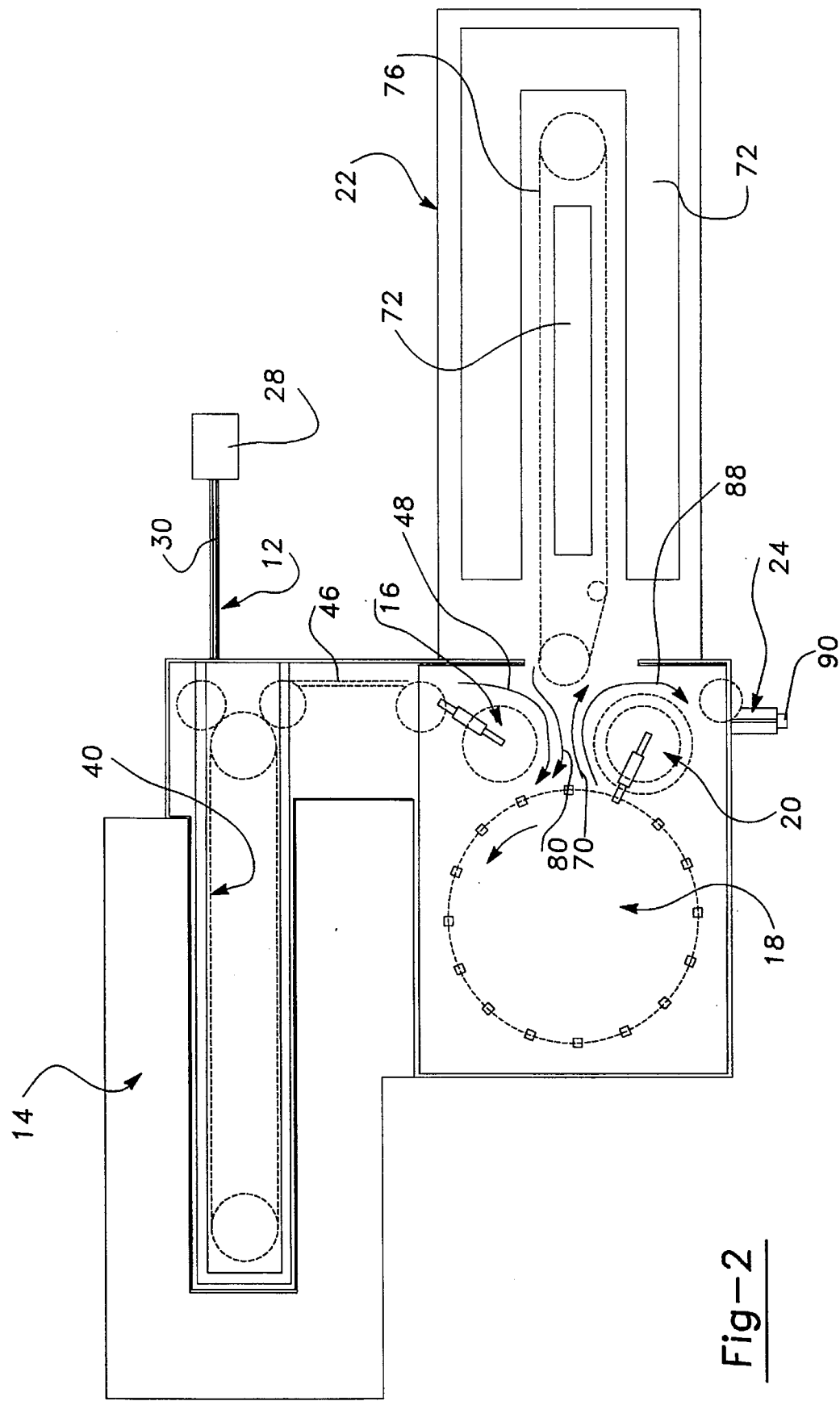
FIG. 2 is a schematic view of an apparatus embodying the principles of the present invention.

Referring now in detail to the drawings, the method of molding containers according to the present invention is outlined by the flow chart in FIG. 1 and, shown schematically in FIG. 2 and generally designated as 10, is a single wheel, double blow, heat set machine embodying the principles of the present invention. The machine 10 and its various components are shown schematically in the figures in order to clearly show the various aspects of the present invention. The particular construction for the various features of the machine 10 are not illustrated in greater detail since the actual mechanisms themselves are well within the level of skill of machine designers within the industry and further since the specific constructions of the various mechanisms are not within the scope of this invention.

The single wheel, double blow, heat set machine 10 of the present invention generally includes seven stations. These stations can be seen in FIG. 2 and are herein referred to as a preform infeed station 12, a preheat oven 14, a first transfer station 16, a blow molding wheel 18, a second transfer station 20, a heat treatment oven 22 and a final container outfeed station 24.

At the preform infeed station 12, injection molded preforms 26 are fed from a preform source 28, which may be a hopper or other bulk feed mechanism, onto a feed conveyor 30. As seen in FIG. 3, the preform 26 generally has a test tube shaped body 32 and includes a neck finish 34 at its upper end. The neck finish further includes a threaded portion 36, which is adapted to receive a closure cap, and a carrier ring or flange 38. The neck finish generally remains unchanged during the blow molding of the preform 26 into the container and is also used to hold the preform 26 and the resulting container during the various processing steps of the present invention.

From the feed conveyor 30, the preform 26 is transferred to a preheat conveyor 40 where a hanger 42 supports the preform 26 by the neck finish 34. The preheat conveyor 40 can be of numerous different constructions but is illustrated in FIG. 2 as an endless conveyor which carries preforms into and out of the preheat oven 14.

Within the preheat oven 14, the preforms 26 travel past heaters 44, which can be radiant, induction or other types of heaters. The heaters 44 increase the temperature profile in the body 32 of the preform 26 and condition the preform 26 such that when the preform exits the preheat oven 14, the body 32 of the preform 26 is at the proper temperature for blow molding.

Figure 4:
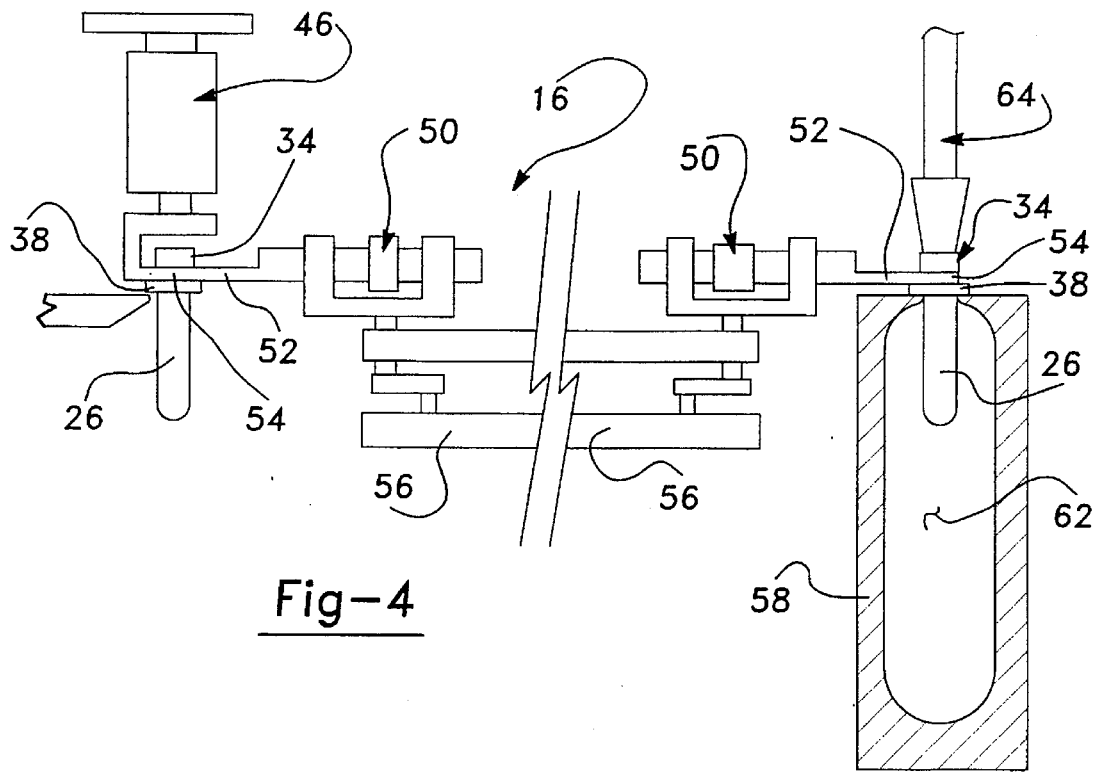
FIG. 4 is a schematic view of a preheated preform being transferred into an intermediate mold prior to initial blow molding.

With the body 32 of the preform 26 at the proper blow molding temperature, the preheated preform 26 is removed from the preheat conveyor 40 and carried by a transfer conveyor 46 to the first transfer station 16. The transfer station 16 transfers the preheated preform 26 to the blow molding wheel 18 as designated by arrow 48 in FIG. 2 and as generally seen in FIG. 4.

The first transfer station 16 includes one or more transfer arms 50, each of which includes a distal end 52 having a caliper 54 or other grasping mechanism adapted to grip the neck finish 34 of the preheated preform 26 and remove it from the transfer conveyor 46. The transfer arms 50 are mounted on a rotating base or frame 56 which is rotatable to cause the transfer arm 50 to position the preform 26 within a first or intermediate mold 58 mounted on the blow molding wheel 18, where it is encapsulated by the closing of the mold 58.

Figure 5:
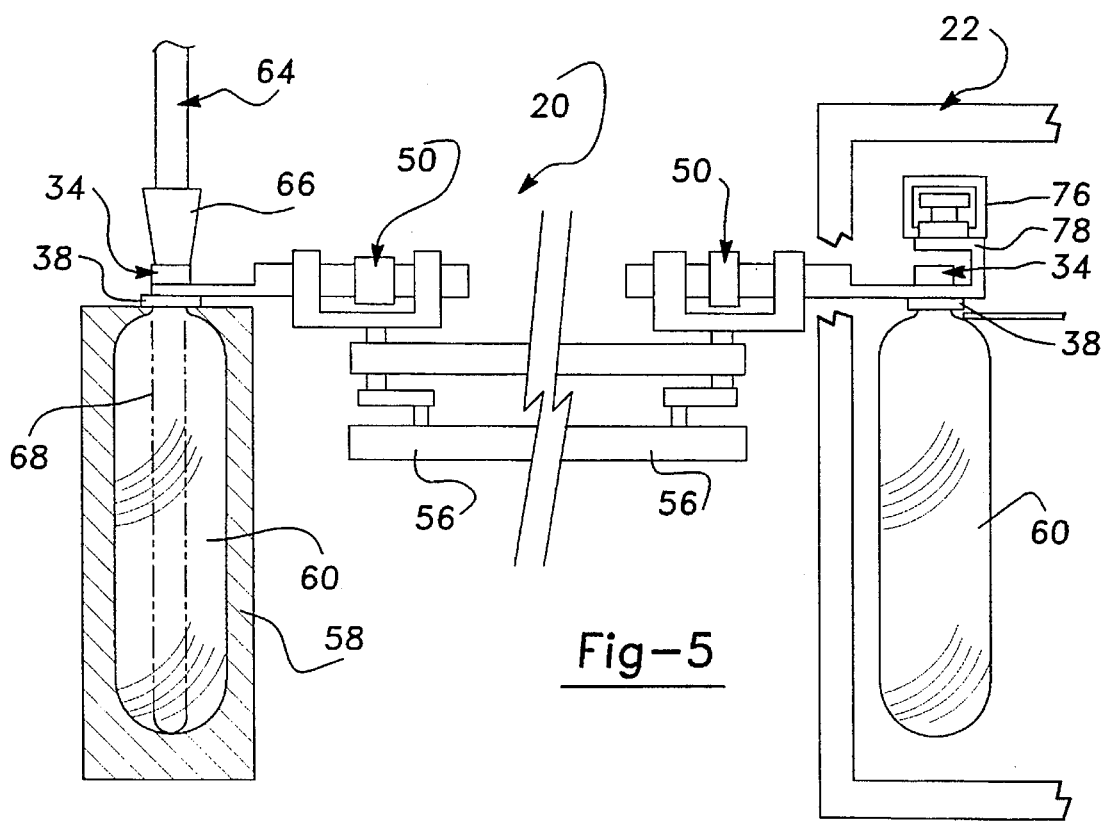
FIG. 5 is a schematic view of a blow molded intermediate container being transferred to a heat treating oven according to the principles of the present invention.

As briefly mentioned above, the blow molding wheel 18 is generally a rotatable wheel having numerous molds mounted about its periphery. Once the preform 26 is enclosed within the mold 58, a blow pin assembly 64 is moved to engage the neck finish 34 of the preform 26 and blow molds the body 32 of the preform into the configuration of an intermediate container, generally designated at 60, as defined by the mold cavity surfaces 62 of the intermediate mold 58. The blow pin 64 is of a conventional design and is seen in FIGS. 4 and 5. Generally, the blow pin 64 includes a stretch rod and a sealing cap or plug 66. The sealing cap 66 engages the neck finish 34 in an air-tight engagement as the stretch rod 68 axially stretches the preform 26 and a blowing medium is introduced into the body 32 of the preform 26 thereby causing the body 32 to inflate into conformity with the mold cavity surfaces 62.

Further details of the blow pin 64 are not disclosed or discussed herein since the blow pin 64 is beyond the scope of the present invention. It should therefore be understood that numerous alternative constructions for the blow pin 64 can be employed as will be readily appreciated by an individual skilled in the present technology.

While the blow pin 64 is illustrated in FIGS. 4 and 5, it should be understood that the blow pin 64 does not engage the preform 26 as it is being transferred into the intermediate mold 58 or as the intermediate container 60 is being transferred out of the intermediate mold 58. Rather, the blow pin is illustrated in these figures merely for the sake of clarity. As will be appreciated, the blow pin 64 only engages the preform 26 and intermediate container 60 respectively after transferring in and before transferring out of the mold 58.

After its formation, the intermediate container 60 is removed from the intermediate mold 58 by the second transfer station 20. The second transfer station 20 is similar to the first transfer station 16 in that it includes one or more transfer arms 50 having calipers 54 at their distal ends 52 to grip the neck finish 34 of the intermediate container 60. Also like the first transfer station 16, the transfer arms 50 are mounted to a rotating base or frame 56. In this manner, the second transfer station 20 transfers the intermediate container 60 from the blow molding wheel 18 to the heat treatment oven 22 as generally designated by arrow 70.

Figure 6:
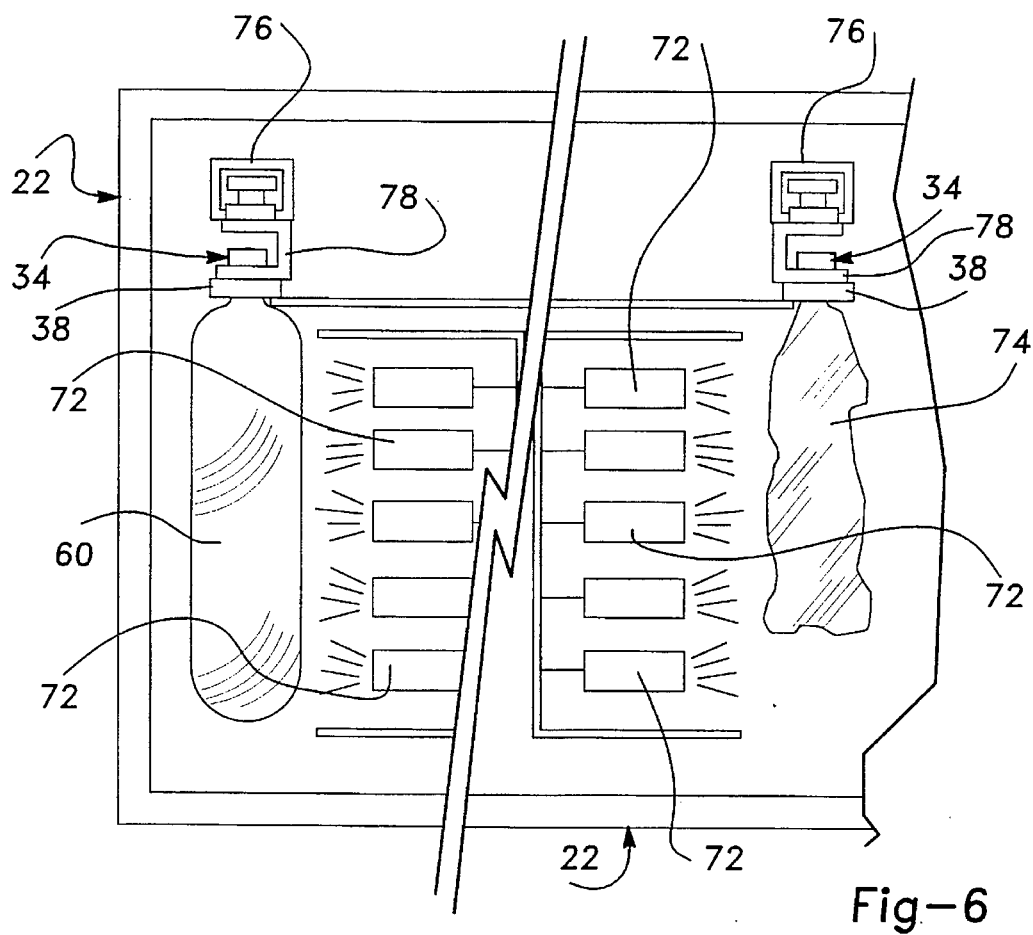
FIG. 6 is a schematic illustration of an intermediate container passing through a heat treating oven according to the principles of the present invention.
Figure 7:
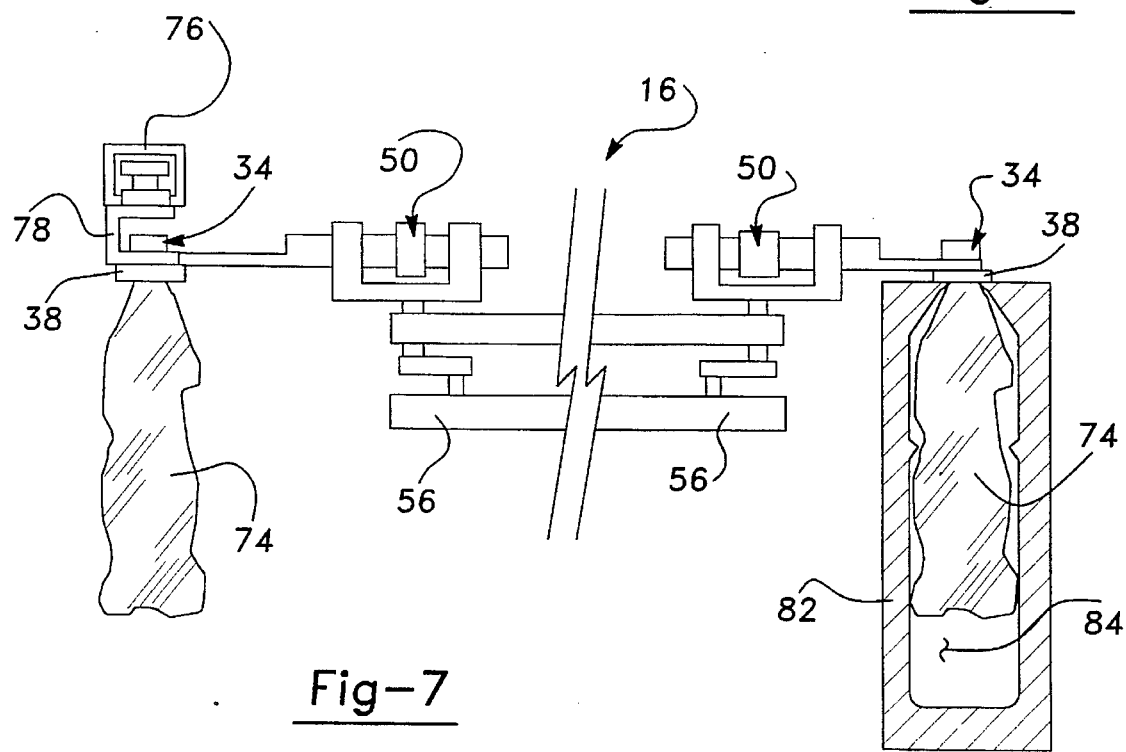
FIG. 7 is a schematic illustration of a heat treated intermediate container being transferred into a final mold cavity prior to final blow molding according to the principles of the present invention.
Figure 8:
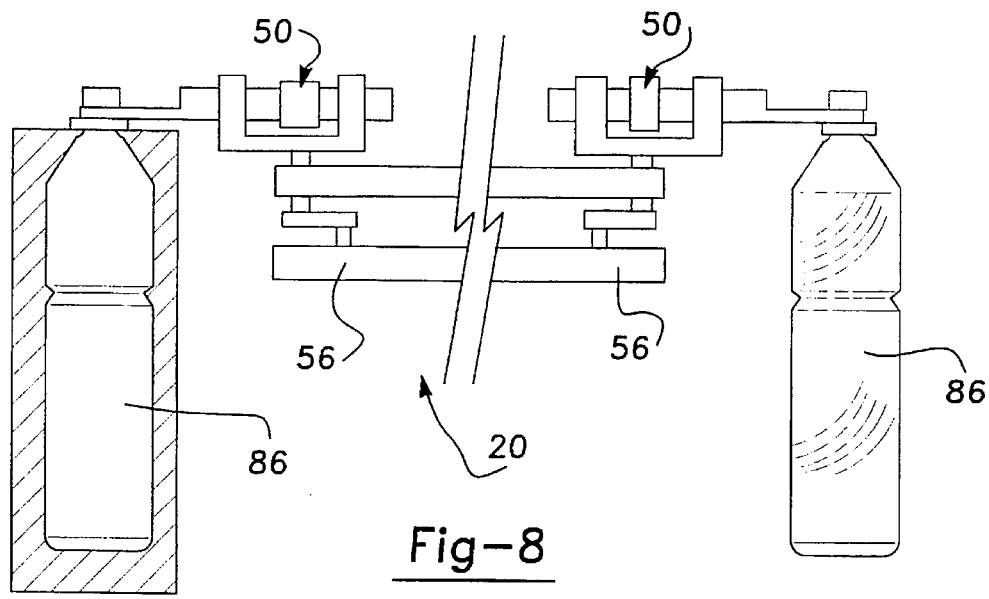
FIG. 8 is a schematic illustration of a final container being transferred from the final mold to an exit conveyor according to the principles of the present invention.

In the heat treatment oven 22, which is sometimes referred to as an annealing oven or a shrink oven 22, are additional banks of heaters 72. Because of various stresses existing in the intermediate containers 60 as a result of the initial blow molding step, the heat generated in the heat treating oven 22 causes a contraction of the polymer chains and results in shrinking and deformation of the body of the intermediate container 60. The resulting heat treated container 74 is generally seen in FIGS. 6 and 7. The intermediate container 60 is carried through the heat treating oven 22 by a heat treating conveyor 76 and hanger 78 which is similar to those used in the preheating oven 14.

After heat treating, the heat treated containers 74 are removed from the heat treating oven 22 by the transfer arms 50 of the first transfer station 16. The transfer arm 50 grasps the heat treated containers 74 about the neck finish 34 and transfer the heat treated container 74, as generally designated by arrow 80, into a final or finishing mold 82 also mounted to the blow molding wheel 18.

The finishing mold 82 includes molding surfaces 84 that define the final configuration of the container 86. While located within the cavity of the finishing mold 82, the heat treated container 74 is again engaged by the blow pin 64 and a blowing medium is introduced therein so as to inflate the intermediate container 74 and cause it to conform with the final configuration of the molding surfaces 84. After this second blow molding step, the final containers 86 are removed from the finishing molds 82 by the transfer arms 50 of the second transfer station 20. As designated by arrow 88, the transfer arms 50 then transfer the final containers 86 to the final container outfeed station 24. Here, the final containers 86 are transported by an output feed conveyor 90 for further processing such as filling, capping and labeling.

From the above discussion, it can now be seen that the general method of blow molding containers 74 according to the present invention is laid out in the flow diagram of FIG. 1. According to this method, preforms 26 are received on a feed conveyor 30 and fed into a preheat oven. In the preheat oven 22, the preform 26 is conditioned until the body 32 of the preform 26 has a temperature profile conducive to blow molding. The preheated preform 26 is then transferred by a first transfer mechanism 16 to an intermediate mold 58 on the blow molding wheel 19 and is blown into an intermediate container configuration 60. The intermediate container 60 is then transferred by a second transfer mechanism 20 from the blow molding wheel 19 to a heat treating oven. Inside the oven 22, the intermediate container 60 is heat treated. This causes the intermediate container 60 to deform and shrink. The heat treated container 74 is then transferred by the first transfer mechanism 16 from the heat treating oven 22 into a finishing mold 82 which is carried by the previously mentioned blow molding wheel 18. In the finishing mold 82, the heat treated container 74 is blow molded into the configuration of the final container 86. After the final molding step, the finished container 86 is removed by the second transfer mechanism 20 from the finishing mold 82 and transferred to an exit conveyor 24 for further processing.

Figure 9:
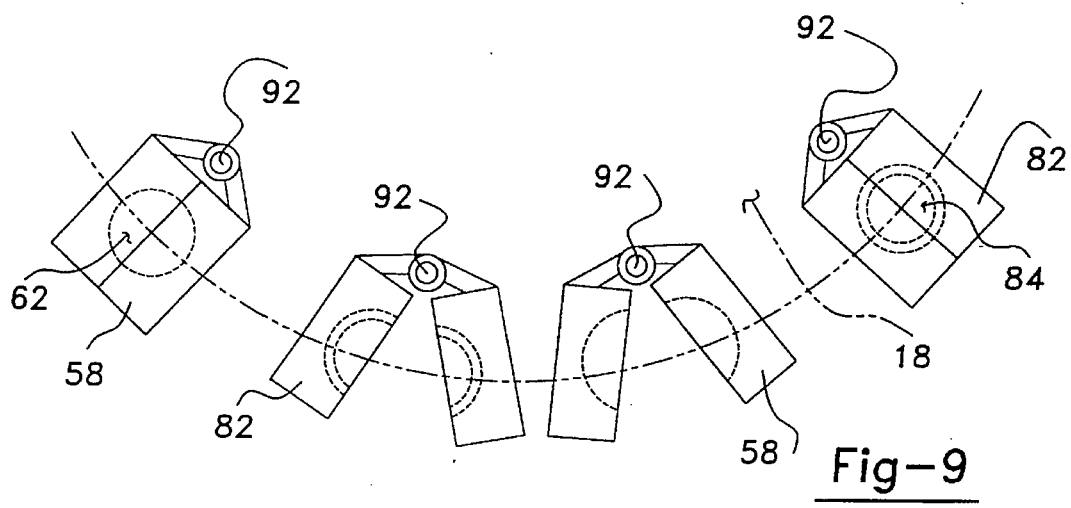
FIG. 9 is a schematic illustration of a portion of a blow molding wheel embodying the principles of the present invention.
Figure 11:
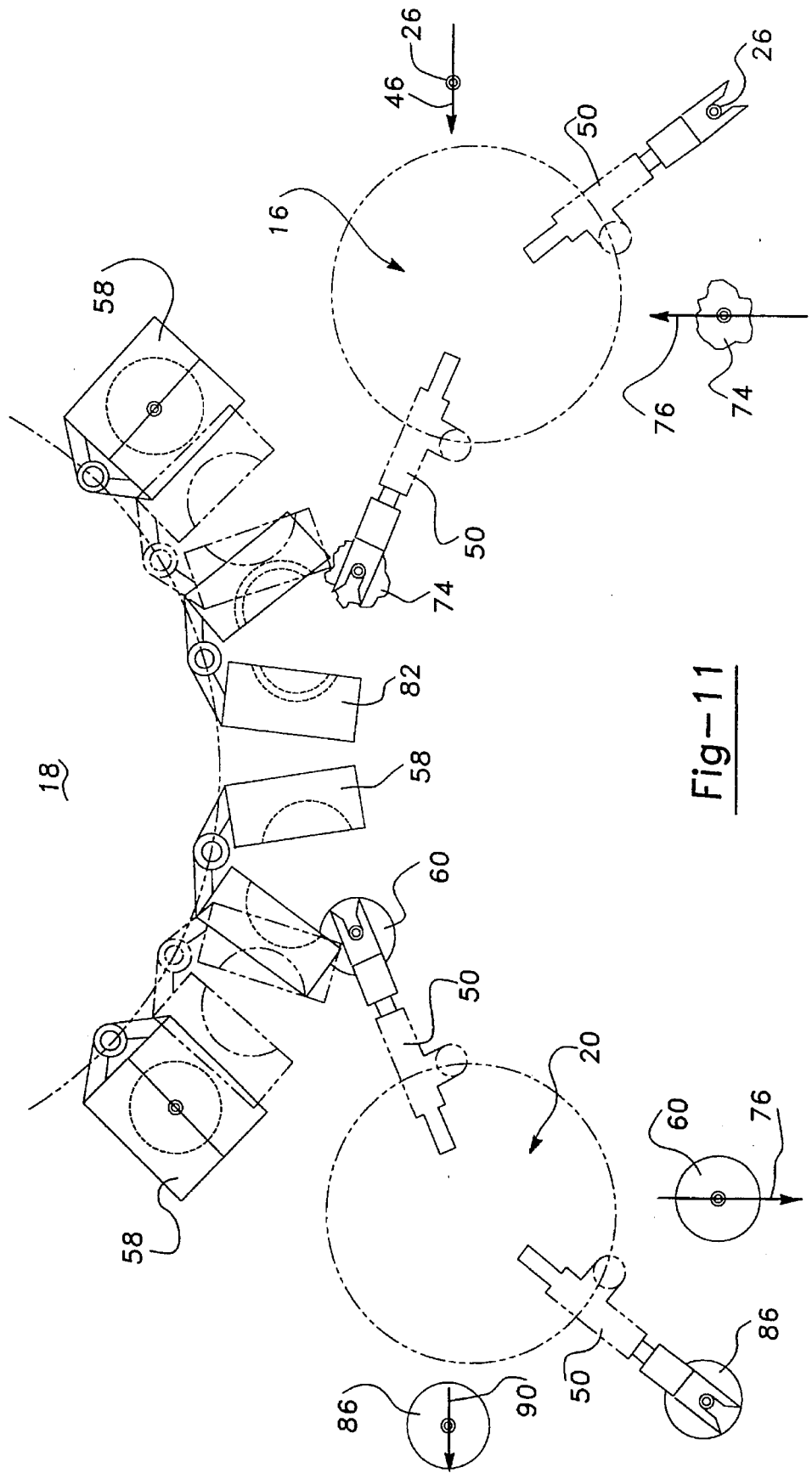
FIG. 11 is a schematic illustration of a portion of the blow molding wheel and transfer mechanisms utilized by the present invention.

As seen from the above, the intermediate molds 58 and the finishing molds 82 are both carried by the same blow molding wheel 18. As seen in FIGS. 9 and 11, various setups for the molds 58 and 82 can be used. For example, the intermediate molds 58 and the finishing molds 82 can be consecutively alternated on the blow molding wheel 18. Accordingly, the transfers arms 50 of the first transfer station 16 alternatingly remove a preheated preform 26 from the transfer conveyor 46 and place it within an intermediate mold 58 and then remove a heat treated container 74 from the heat treating conveyor 76 and placed within a finishing mold 82. At the second transfer station 20, the transfer arms 50 alternatingly remove an intermediate container 60 from the intermediate molds, loading them onto the heat treating conveyor 76, and then remove a final container 86 from a finishing mold 82 and load it onto the exit conveyor 90.

Alternate set ups for the molds 58 and 84 can also be utilized with the present invention. In particular, two or more finishing molds 82 can be located between successive intermediate molds 58 or vice versa. Such mold set ups on the blow molding wheel 18 allows the apparatus 10 of the present invention to accommodate either increased residence times within the molds themselves or increased residence times within the heat treating oven 22. If these alternative mold set ups are utilized, operation of the first and second transfer stations 16 and 20 need to be correspondingly coordinated so that the appropriate stage of the final container 86 is loaded into the appropriate mold or onto the appropriate conveyor thereby ensuring proper operation of the machine 10. Accordingly, the present invention would utilize an appropriately programmed microprocessor base control system (not shown) although an appropriate mechanical control mechanism could also be used.

The molds themselves 58 and 82 are generally of the type known as book-style molds. With this style of mold and machine 10, the individual mold halves are hinged relative to one another about a vertical axis 92 that is parallel to the axis of rotation (not shown) of the blow molding wheel 18.

Figure 10:
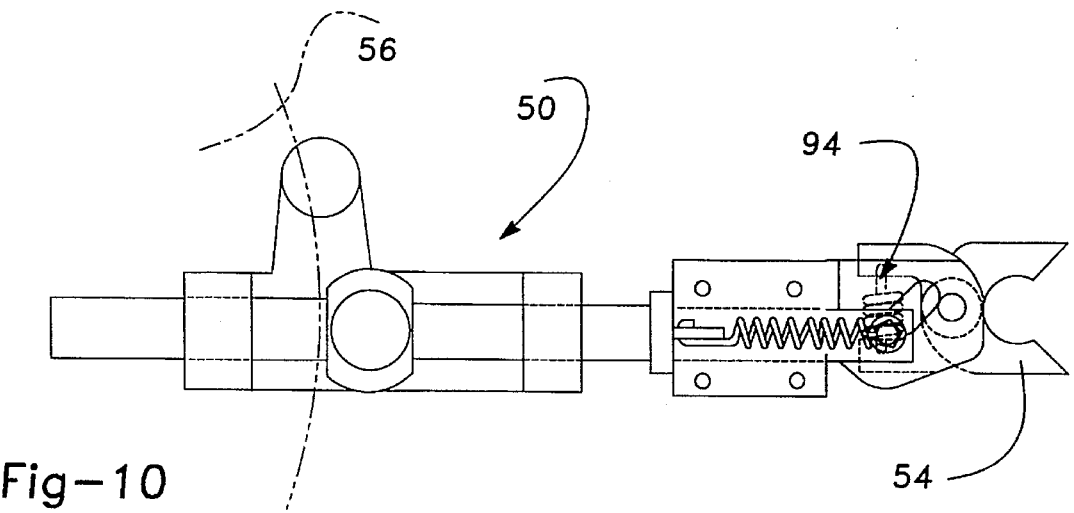
FIG. 10 is a schematic illustration of a transfer arm as utilized with the present invention.

The transfer arms 50 are all be of the same construction but different constructions, if warranted, could be used. One type of the transfer arm is generally illustrated in FIG. 10. This transfer arm 50 includes an actuation mechanism 94 which allows for the caliper 54 to articulate and more easily grasp the neck finish 34 of the various stages of the final container 86. Since such transfer arms 50 are well known within the industry and the present transfer arm 50 is of a generally conventional construction, the transfer arm 50 is not shown or discussed in any greater detail, it being understood that a person skilled in this technology will readily appreciate that numerous alternative constructions that could be employed for the transfer arm 50.

While the above description constitutes the preferred embodiment of the present invention, it will be appreciated that the invention is susceptible to modification, variation and change without departing from the proper scope and fair meaning of the accompanying claims.

I claim:

1. An apparatus for blow molding thermally stable containers capable of withstanding processing conditions including hot-filling or pasteurizing of the contents of the container, the blow molding being performed as a double blow molding method, said apparatus comprising:

a preheat station adapted to condition preforms for subsequent blow molding;

a blow molding station including a single rotatable blow molding wheel, said wheel including a plurality of first and second molds provided at spaced locations therearound, said first molds having first molding surfaces defining a first mold cavity of a first configuration for forming an intermediate container, said second molds having second molding surfaces defining a second mold cavity of a second configuration for forming a final container, said first configuration being different from said second configuration, said blow molding station also including a blow pin capable of introducing a blowing medium into and respectively causing inflation of said preforms and said intermediate container into conformity with said intermediate and final mold cavities;

a heat treating station adapted to heat treat said intermediate containers;

conveyor means for transporting preforms to, through and from said preheating station, said conveyor means also for transporting said intermediate containers through said heat treating station and for transporting said final containers from said blow molding station; and transfer means for transferring said preforms from said conveyor means to said first molds for initial blow molding of said preforms into said intermediate containers, said transfer means also transferring said intermediate containers from said first molds to said heat treating station for producing heat treated intermediate containers, said transfer means also further transferring said heat treated intermediate containers from said heat treating station to said second molds for blow molding into said final containers, and said transfer means also transferring said final containers from said second molds to said conveyor means.

2. An apparatus as set forth in claim 1 wherein said first and second molds are alternatingly located about said wheel.

3. An apparatus as set forth in claim 1 wherein two of said first molds are located between each pair of said second molds.

4. An apparatus as set forth in claim 1 wherein two of said second molds are located between each pair of said first molds.

5. An apparatus for blow molding thermally stable containers capable of withstanding processing conditions including hot-filling or pasteurizing of the contents of the container, the blow molding being performed as a double blow molding method, said apparatus comprising:

a preheat station adapted to condition preforms for subsequent blow molding;

a blow molding station including a single rotatable blow molding wheel, said wheel including a plurality of first and second molds provided at spaced locations therearound, said first molds having molding surfaces defining an intermediate mold cavity for forming an intermediate container, said second molds having molding surfaces defining a final mold cavity for forming a final container, said blow molding station also including a blow pin capable of introducing a blowing medium into and respectively causing inflation of said preforms and said intermediate container into conformity with said intermediate and final mold cavities;

a heat treating station adapted to heat treat said intermediate containers;

conveyor means for transporting preforms to, through and from said preheating station, said conveyor means also for transporting said intermediate containers through said heat treating station and for transporting said final containers from said blow molding station; and transfer means for transferring said preforms from said conveyor means to said first molds for initial blow molding of said preforms into said intermediate containers, said transfer means also transferring said intermediate containers from said first molds to said heat treating station for producing heat treated intermediate containers, said transfer means also further transferring said heat treated intermediate containers from said heat treating station to said second molds for blow molding into said final containers, and said transfer means also transferring said final containers from said second molds to said conveyor means said transfer means including two transfer stations, one of said transfer stations transferring said preforms from said conveyor means to said first molds and also transferring said heat treated intermediate containers from said heat treating station to said second molds.

6. An apparatus as set forth in claim 5 wherein the other of said transfer stations transfers said intermediate containers from said first molds to said heat treating station and also transfers said final containers from said second molds to said conveyor means.

7. A method for blow molding thermally stable containers capable of withstanding processing conditions including hot-filling or pasteurizing of the contents of the container, the blow molding method being performed as a double blow molding method utilizing a single blow molding wheel having first and second molds positioned thereon, the method comprising the steps of:

providing preforms to a preheat station;

conditioning said preforms in said preheating station for subsequent blow molding into intermediate containers;

transferring said preforms to said blow molding wheel and locating said preforms within said first molds;

blow molding said preforms into intermediate containers;

removing said intermediate containers from said first molds and transferring said intermediate containers to a heat treating station;

heat treating said intermediate containers to produce heat treated intermediate containers;

transferring said heat treated intermediate containers from said heat treating station to said blow molding wheel and into said second molds;

blow molding said heat treated intermediate containers in said second molds to produce final containers; and removing said final containers from said second molds.

* * * * *